(12) United States Patent
Cho et al.

(10) Patent No.: US 8,099,052 B2
(45) Date of Patent: Jan. 17, 2012

(54) METHOD AND APPARATUS FOR EFFECTIVE MULTI-CELL INTERFERENCE CONTROL SERVICE

(75) Inventors: Sung-Rae Cho, Daejun (KR); Wan Choi, Daejun (KR); Dong-In Kim, Gyeonggi-do (KR)

(73) Assignee: Foundation for Collaboration Sungkyunkwan University, Gyeonggi-Do (KR)

( * ) Notice: Subject to any disclaimer, the term of this patent is extended or adjusted under 35 U.S.C. 154(b) by 376 days.

(21) Appl. No.: 12/371,602

(22) Filed: Feb. 15, 2009

(65) Prior Publication Data

US 2010/0159972 A1    Jun. 24, 2010

(30) Foreign Application Priority Data

Dec. 19, 2008  (KR) .................. 10-2008-0130002

(51) Int. Cl.
*H04B 15/00*   (2006.01)
*H04B 1/00*    (2006.01)
(52) U.S. Cl. .................... 455/63.1; 455/296; 455/67.13
(58) Field of Classification Search .................. 455/63.1
See application file for complete search history.

(56) References Cited

U.S. PATENT DOCUMENTS 7,634,232 B2 *  12/2009  Waxman ..................... 455/63.1
7,643,811 B2 *   1/2010  Reunamaki et al. ....... 455/226.2

FOREIGN PATENT DOCUMENTS

KR      1020080026692       3/2008

OTHER PUBLICATIONS

"Multicell Downlink Capacity with Coordinated Processing" EURASIP Journal on wireless communications and Networking, vol. 2008, Article ID 586878, 19pages, 2008 by Sheng Jing, David N.C Tse, Joseph B. Soriaga, Jilei Hou, John E. Smee and Roberto Padovani.

* cited by examiner

*Primary Examiner* — Hai L Nguyen
(74) *Attorney, Agent, or Firm* — Mark M. Friedman (57) ABSTRACT

There are provided a method and apparatus for an effective multi-cell interference control service, to make it possible for users located at a cell boundary to dynamically select a suitable interference control technique by monitoring interference information collected by user terminals and network conditions of a serving base station and adjacent base stations to solve co-channel interference by adjacent cell users.

9 Claims, 7 Drawing Sheets

(a) Neighboring zones     (b) Isolated zones     (c) Overlapped zones

METHOD AND APPARATUS FOR EFFECTIVE MULTI-CELL INTERFERENCE CONTROL SERVICE

CROSS-REFERENCE TO RELATED APPLICATION

This application claims the benefit of Korean Patent Application No. 2008-0130002, filed Dec. 19, 2008, the disclosure of which is hereby incorporated herein by reference in its entirety.

BACKGROUND OF THE INVENTION

1. Technical Field

The present invention relates to a method and apparatus for an effective multi-cell interference control service, and more particularly, to a method and apparatus for a multi-cell interference control service, to make it possible for users located at a cell boundary to dynamically select a suitable interference control technique by monitoring interference information collected by user terminals and network conditions of a serving base station and adjacent base stations to solve co-channel interference by adjacent cell users.

2. Discussion of Related Art

When a user of a wireless terminal is located at a cell/sector boundary, a signal quality of the user's terminal seriously deteriorates by co-channel interference. The conventional art to solve the aforementioned problem has used the techniques, such as power control, user-specific beamforming, soft handover, and frequency re-use among others. However, as a transmission rate becomes high and an available frequency band becomes broad, a service cell radius becomes considerably small and frequent handover is accompanied.

To improve the service cell radius, the next-generation mobile communication standards positively propose the use of a relay. Further, under the conditions where the backhaul capacity between adjacent cells is secured, there are presented the technologies related to inter-cell interference coordination (ICIC), whereby users in a cell-outer area cooperatively and actively solve inter-cell interference (ICI). The ICIC technology is importantly regarded in the orthogonal frequency division multiple access (OFDMA) mode. The ICIC technology is included in the current 802.16 PHY standards and makes positive contributions to the 802.16m TG in relation to the network multiple input multiple output (MIMO) technology.

Furthermore, the ICIC technology has advantages several times those of the inter-cell scheduling technique and the joint power control technique. It also solves efficiency deterioration caused by the relativity between antennas in existing MIMO systems, by using a macro virtual multi-antenna at a distance territorially. In the macro multi-antenna environment among base stations, research is actively conducted regarding the technologies, such as distributed power control (DPC), joint zero forcing (Joint ZF), joint minimum mean square error (Joint MMSE), distributed space-time block code (STBC), joint beamforming, preceding matrix index (PMI) coordination and the like.

However, the aforementioned technologies are based on the precondition: the feedback of a circuit switching (CS) call from a terminal and an internet protocol multimedia subsystem (IMS) session, i.e., "combined CS call and IMS session (CSI)". Therefore, these technologies have drawbacks in that backhaul traffic occurs when a serving base station (SBS) receiving the transmitted feedback exchanges channel information with adjacent cells.

To solve the problem in that the backhaul traffic occurs in the macro multi-antenna environment, research has started in a limited backhaul capacity environment. In an uplink, research on the inter-base station collaboration interference cancellation is in progress. This research is to accompany the inter-base station channel state information (CSI) sharing and to reduce the inter-base station channel information sharing, by distributed decoding or the like which uses the Joint MMSE or the BCJR algorithm applying successive interference cancellation (SIC).

In an indoor femto cell which is commercialized, it is easy to share the inter-base station channel information due to low backhaul latency. Accordingly, an inter-base station collaboration technique can be applied to the indoor femto cell. In this regard, research needs to be conducted to develop the inter-base station collaboration technology depending on the backhaul latency, and the inter-base station collaboration technology of a flexible cluster size based on level coordination considering the inter-adjacent base station backhaul latency or the like.

SUMMARY OF THE INVENTION

Therefore, the present invention is directed to provide a process of a multiple base station multi input multi output (MIMO) service in a flexible cluster size that the serving station approved an adjacent collaborating cell based on backhaul traffic latency, after the serving base station receives a report on analysis results of interference level and gain in a terminal, for the multiple base station MIMO service.

Another object of the present invention is to provide a process during which users located at a cell boundary dynamically select a suitable interference control technique by monitoring interference information collected by user terminals and network conditions of a serving base station and adjacent base stations to solve co-channel interference by adjacent cell users.

In accordance with an aspect of the present invention, there is provided an apparatus for a multi-cell interference control service, comprising: a user terminal for requesting interference control from a serving base station; and a serving base station for requesting the interference control from an adjacent base station, wherein the user terminal comprises: an signal to interference plus noise ratio (SINR) measurement unit for sensing interference level of an adjacent cell; a collaboration determination unit for determining whether to collaborate with the adjacent base station, considering a user QoS (quality of service); a collaboration gain determination unit for requesting multi-cell interference control, considering interference control gain; and a collaboration request signal transmission unit for requesting collaboration with the adjacent base station from the serving base station, and wherein the serving base station comprises: a collaboration gain information collection unit for collecting collaboration gain information of the user terminal; an inter-cell signal control unit for requesting inter-cell interference control; and a service start determination unit for determining whether to start an interference control service with a collaborating adjacent cell.

In accordance with another aspect of the present invention, there is provided a method for a multi-cell interference control service, comprising: a first process during which each user terminal requests interference control from a serving base station; and a second process during which the serving base station requests the interference control from an adjacent base station, wherein the first process comprises steps of: sensing interference level of an adjacent cell in an signal to interference plus noise ratio (SINR) measurement unit; determining whether to collaborate with the adjacent base station by considering a user QoS (quality of service) in a collaboration determination unit; determining interference control gain to request multi-cell interference control in a collaboration gain determination unit; and transmitting a signal for requesting collaboration with the adjacent base station to the serving base station in a collaboration request signal transmission unit, and wherein the second process comprises steps of: collecting collaboration gain information of the user terminal in a collaboration gain information collection unit; requesting inter-cell interference control from the adjacent base station after checking the collaboration gain information in an inter-cell signal control unit; and determining whether to start an interference control service with the collaborating adjacent cell in a service start determination unit.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown.

Figure 1:
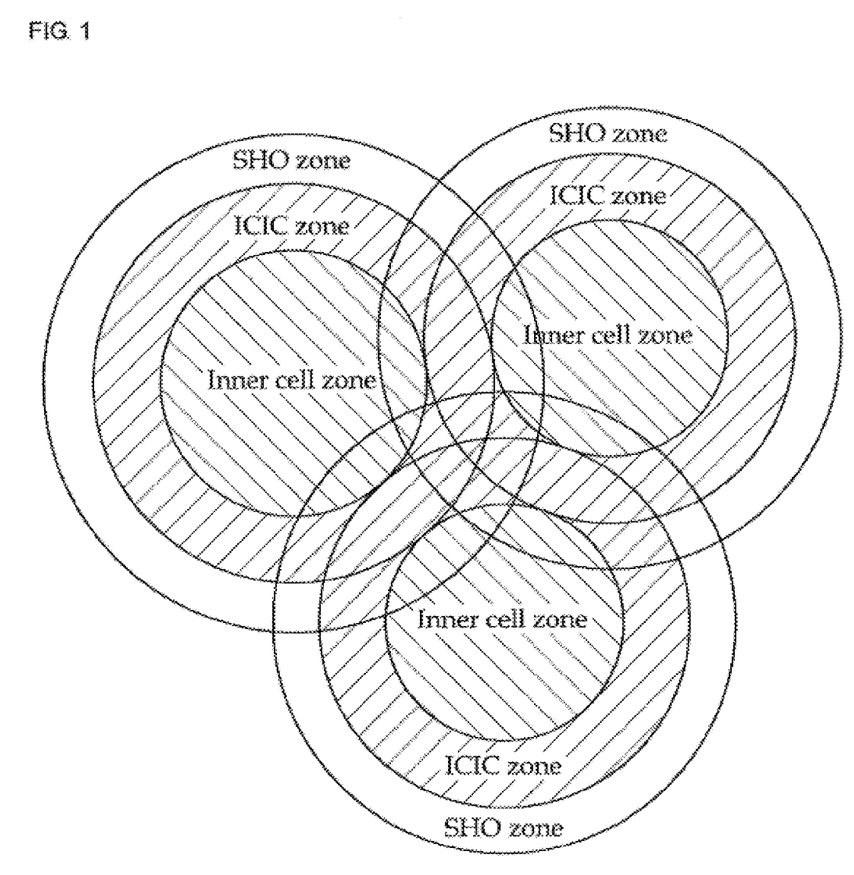
FIG. 1 illustrates an inter-cell interference coordination (ICIC) support mechanism.

FIG. 1 illustrates an inter-cell interference coordination (ICIC) support mechanism.

As illustrated in FIG. 1, when a terminal user enters an ICIC zone, considering pilot strength of a serving base station (SBS), a terminal starts receiving pilots of adjacent cells, collects pilot signals of the adjacent cells for handover, and calculates a received interference level of the adjacent cell.

Figure 2:
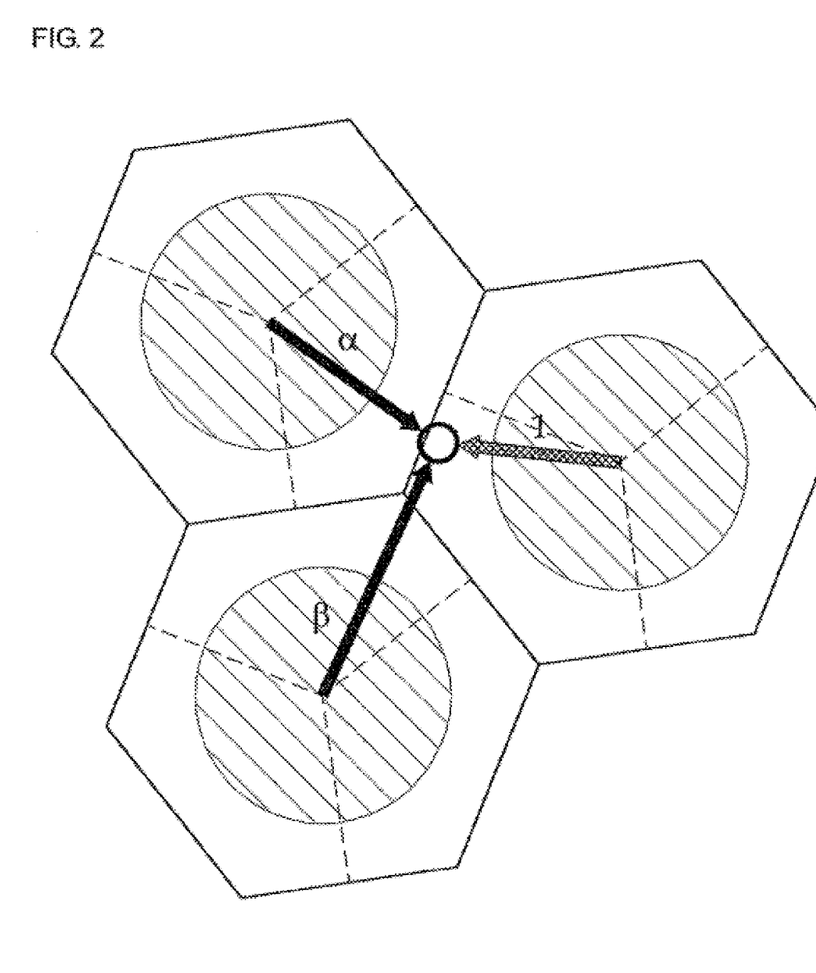
FIG. 2 illustrates an example of normalized channel gain collection for configuring a flexible cluster.

FIG. 2 illustrates an example of normalized channel gain collection for configuring a flexible cluster.

As illustrated in FIG. 2, a terminal i of a user located at a cell boundary obtains each channel gain ratio of a pilot signal of an adjacent cell to a pilot signal of a cell to which the terminal i belongs, as $\alpha^2$ and $\beta^2$ (wherein, $\alpha > \beta$). As for multiple antennas, a channel gain ratio is calculated with a value of a matrix size.

Channel capacity $R_{i\_single}$ of the user terminal i in the interference environment is calculated using Formula 1. Assuming that equal power P is assigned to any cell boundary user terminal i, a channel capacity loss which is caused by an adjacent cell interference signal is calculated, using P.

$$R_{i\_single} = \log\left[1 + \frac{P}{N_0 + (\alpha^2 + \beta^2)P}\right] \approx -\log(\alpha^2 + \beta^2) \quad \text{[Formula 1]}$$

$$SINR = \frac{SNR}{1 + (\alpha^2 + \beta^2)SNR} \approx \frac{1}{(\alpha^2 + \beta^2)} \quad \text{[Formula 2]}$$

Wherein SNR=INR=P/$N_0$, SNR is a ratio of noise to a transmitting signal assigned to a self cell user, INR is a ratio of noise to a transmitting signal assigned for an adjacent cell user, $N_0$ is noise power, SINR is a transmitting signal to interference plus noise ratio.

When a SINR value in the interference environment is lower than a set threshold value $\lambda$, multi-cell interference control gain for multi-cell interference control is calculated, using Formula 2.

When the channel capacity $R_{i\_single}$ of the user terminal i, calculated by Formula 1, does not reach channel capacity $R_{req}$ (bps/Hz) required to satisfy a user QoS, it is preferable to use a threshold value $2^{Rreq}-1$.

When the calculated channel capacity $R_{i\_single}$ of the user terminal i does not satisfy the user QoS, the QoS is satisfied by obtaining collaboration interference control gain. The terminal calculates the collaboration interference control gain with an adjacent base station, using Formula 3 or Formula 4 When the number of collaborating cells is two, Formula 3 is used, and when the number of collaborating cells is three, Formula 4 is used. Only when the calculated collaboration interference control gain is equal to or more than the channel capacity $R_{req}$, the process of calculating collaboration interference control probability is performed as follows: Then, it is preferable to progress the process in the order of the lower number of collaborating cells.

$$R_{i\_multicell2} = \log\left[1 + \frac{(1+\alpha^2)P}{N_0 + \beta^2 P}\right] \approx \log\left[\frac{1+\alpha^2}{\beta^2}\right] \quad \text{[Formula 3]}$$

$$R_{i\_multicell3} = \log\left[1 + \frac{(1+\alpha^2+\beta^2)P}{N_0}\right] \approx \log[(1+\alpha^2+\beta^2)SNR] \quad \text{[Formula 4]}$$

The terminal finally calculates multi-cell handover probability, using Formula 5 when the number of collaborating cells is two, and using Formula 6 when the number of collaborating cells is three. When the calculated multi-cell handover probability exceeds a preset threshold value $\gamma$ ($0 \leq \gamma \leq 1$), a collaboration interference control request signal is transmitted to the serving base station. Then, the threshold value $\gamma$ is a normalized value of the multi-cell interference gain which is obtained compared to the gain in a single-cell interference environment. When the threshold value $\gamma$ is 1, this indicates that the multi-cell interference gain is great (interference signal gain→infinite). When the threshold value $\gamma$ is 0, this indicates that the multi-cell interference gain is zero (interference signal gain→0). When the threshold value $\gamma$ is set by using an approximate value of multi-cell handover probability in Formula 5 and Formula 6, it is preferable to use a different value, depending on the number of collaborating cells. Furthermore, it is preferable to variably set the threshold value $\gamma$, depending on inter-collaborating cell costs and user profiles.

Multi-cell handover probability = [Formula 5]

$$\frac{R_{i\_multicell2} - R_{i\_single}}{R_{i\_multicell2}} = \log_X\left[1 + \frac{\alpha^2 P}{N_0 + \beta^2 P}\right]$$

Wherein, $x = 1 + \frac{(1+\alpha^2)P}{N_0 + \beta^2 P}$

Multi-cell handover probability = [Formula 6]

$$\frac{R_{i\_multicell3} - R_{i\_single}}{R_{i\_multicell3}} = \log_X\left[1 + \frac{(\alpha^2 + \beta^2)P}{N_0}\right]$$

Wherein, $x = 1 + \frac{(1+\alpha^2+\beta^2)P}{N_0}$

In order that the multi-cell handover probability can be easily embodied in the terminal, it is preferable to use Formula 7 and Formula 8, respectively, instead of Formula 5 and Formula 6, by using $$\log_c^b = \log_a^b / \log_a^c \approx \frac{b-1}{c-1}$$

Multi-cell handover probability = $\frac{\alpha^2}{1+\alpha^2}$ [Formula 7]

Multi-cell handover probability = $\frac{\alpha^2 + \beta^2}{1+\alpha^2+\beta^2}$ [Formula 8]

Figure 4:
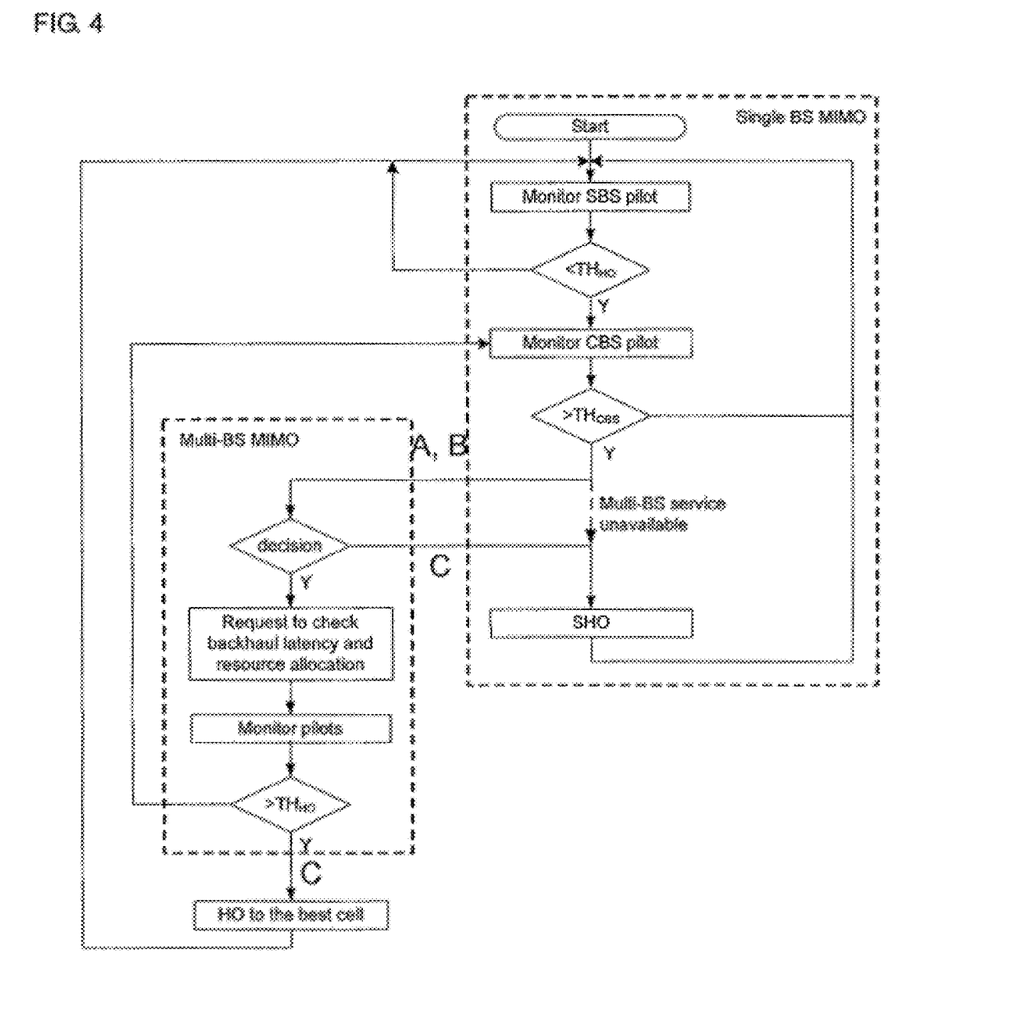
FIG. 4 is a flow chart illustrating flexible cluster size multi-BS service procedure.
Figure 5:
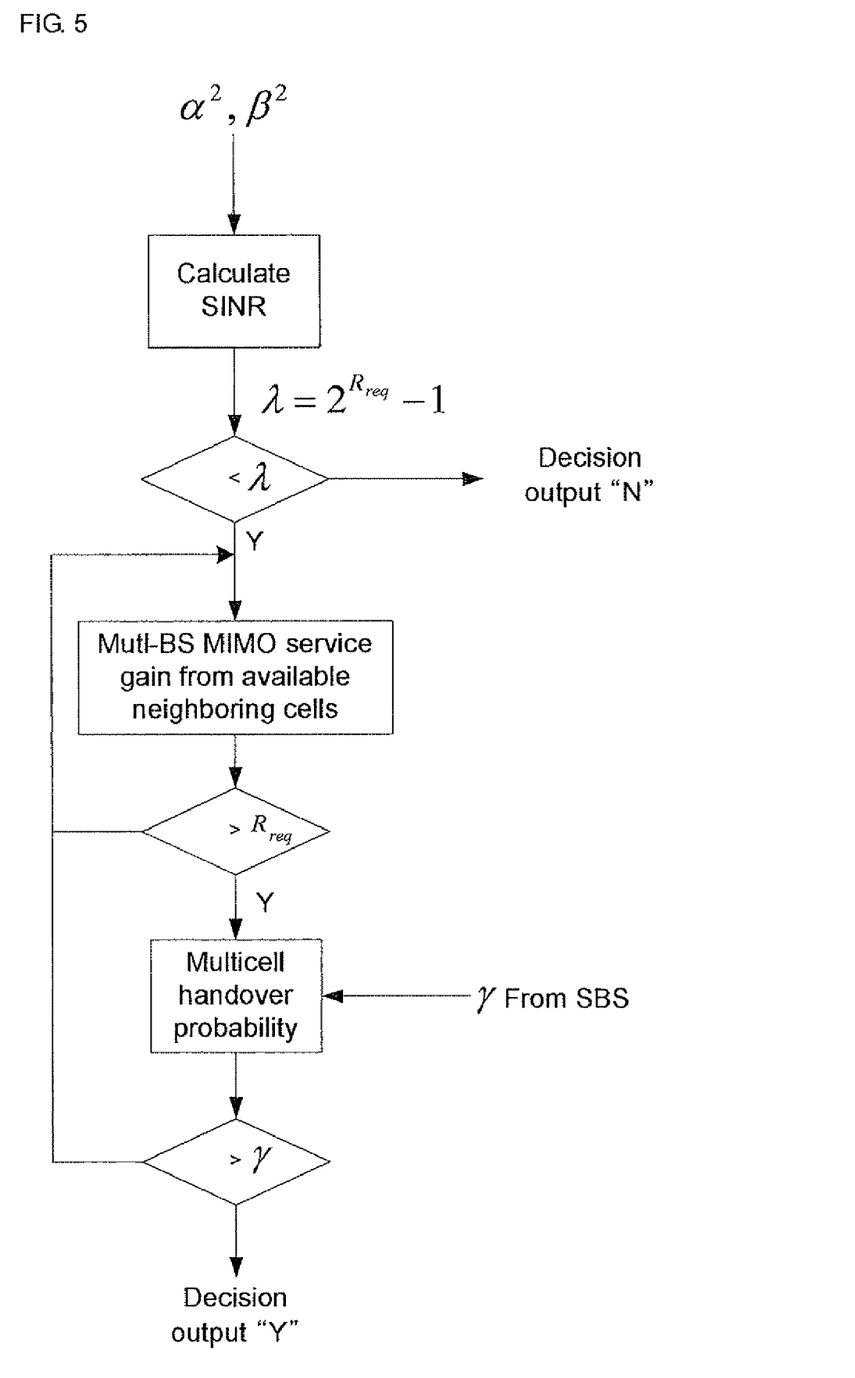
FIG. 5 is a flow chart illustrating, in detail, a decision step in a process A as shown in FIG. 4.

The above process corresponding to a determination step 460 shown in FIG. 4 is illustrated in FIG. 5.

FIG. 5 is a flow chart illustrating, in detail, the determination step 460 in a process A as shown in FIG. 4.

When the multi-cell handover probability is greater than the threshold value γ, the terminal finally transmits the collaboration interference control 15 request signal to the serving base station. The collaboration interference control request signal as transmitted may include the ID of the collaborating interference cell and the handover probability calculated to give the priority order among a number of users. When a number of cell boundary users competitively request by considering a limit of the number of feedback bits, it is possible to selectively collect by reflecting access competition probability depending on the multi-cell handover probability.

Figure 3:
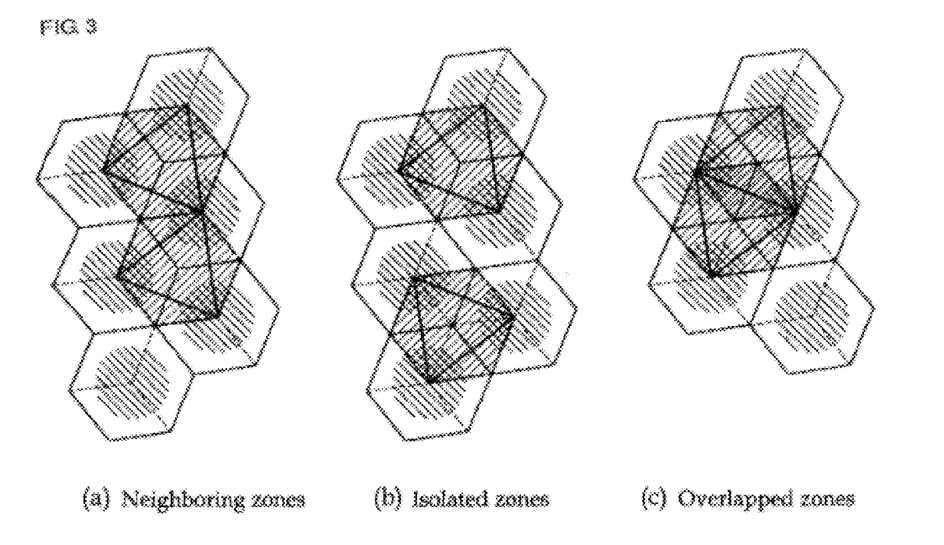
FIG. 3 illustrates a flexible cluster size for multi-BS service support according to backhaul latency.

FIG. 3 illustrates a flexible cluster size for multi-BS service support according to backhaul latency.

The serving base station which receives information of an adjacent collaborating cell from the terminal checks the backhaul latency of the adjacent collaborating cell and configures a flexible multiple base station MIMO cluster consisting of three approved base stations. As shown in FIG. 3, a map of the configured multiple base station cluster may include three cases where: (a) the base stations are neighbored, (b) the base stations are isolated from one another and (c) the base stations are overlapped. The serving base station SBS configures the cluster map, based on the results of (1) the backhaul traffic latency among the adjacent cells, (2) an available cell source and (3) physically disjoint conditions.

Since the cluster map is differently configured as described above, procedures of conversion are defined as the following three types;

A. conversion from single base station MIMO to multiple base station MIMO

B. conversion from multiple base station MIMO to multiple base station MIMO

C. conversion from multiple base station MIMO to single base station MIMO

FIG. 4 is a flow chart illustrating a multiple base station service in a flexible cluster size in a mobile environment.

As illustrated in FIG. 4, the processes of conversion A, B and C are determined depending on the pilot signal strength of a cell.

In step 410, a terminal first senses pilot signal strength of a serving base station SBS. In step 420, the pilot signal strength of the serving base station SBS is compared with a handover threshold value $TH_{HO}$. When the pilot signal strength of the serving base station SBS is lower than the handover threshold value $TH_{HO}$, in step 430 the terminal searches an adjacent cell (collaborating base station CBS), to sense the pilot strength of the adjacent cell. In step 440, the pilot signal strength of the searched adjacent cell is compared with an adjacent cell interference threshold value $TH_{CBS}$. Regarding the adjacent cell(s) which has the pilot signal strength being greater than the adjacent cell interference threshold value $TH_{CBS}$, a scale of gain/loss caused by interference is calculated by using Formula 1 as described above. For user scheduling, it is preferable to report the scale of gain/loss caused by interference, which is calculated by Formula 1, to the serving base station.

In step 470, after checking the inter-cell backhaul conditions regarding the adjacent collaborating cells, which are collected from the terminal, and checking whether there is a resource for collaborating transmission within the adjacent cells, the serving base station informs the adjacent collaborating cell of the final possibility of a request from the terminal. To check the inter-cell backhaul conditions and whether there is the resource, preferably the serving base station may periodically check the network condition by the method, such as ping or the like. However, the checking needs to include a process of acquiring a channel resource for the collaborating communication with the adjacent base station or a process of pre-occupying a collaborating communication channel.

FIG. 5 is a flow chart illustrating, in detail, the determination step 460 in the process A as shown in FIG. 4.

As illustrated in FIG. 4, when the multiple base station MIMO cluster is configured as the serving base station finally approves the adjacent cell collaborating request, the terminal periodically and restrictively feedbacks information including the channel condition of the adjacent cell to the serving base station.

When one or more gain, among the cell pilot channels collected depending on the movement of the terminal and the interference level of the adjacent cell, deteriorates (i.e., when the multiple base station MIMO service gain deteriorates), the multiple base station MIMO cluster is re-configured by re-performing the adjacent cell monitoring and repeatedly performing the adjacent cell collaborating request. To the contrary, when one or more gain among the cell pilot channels is improved during the multiple base station MIMO service, it is preferable to convert to the single base station service corresponding to the most improved pilot channel and to convert to the single base station service based on the results of measuring the SINR of Formula 1.

Figure 6:
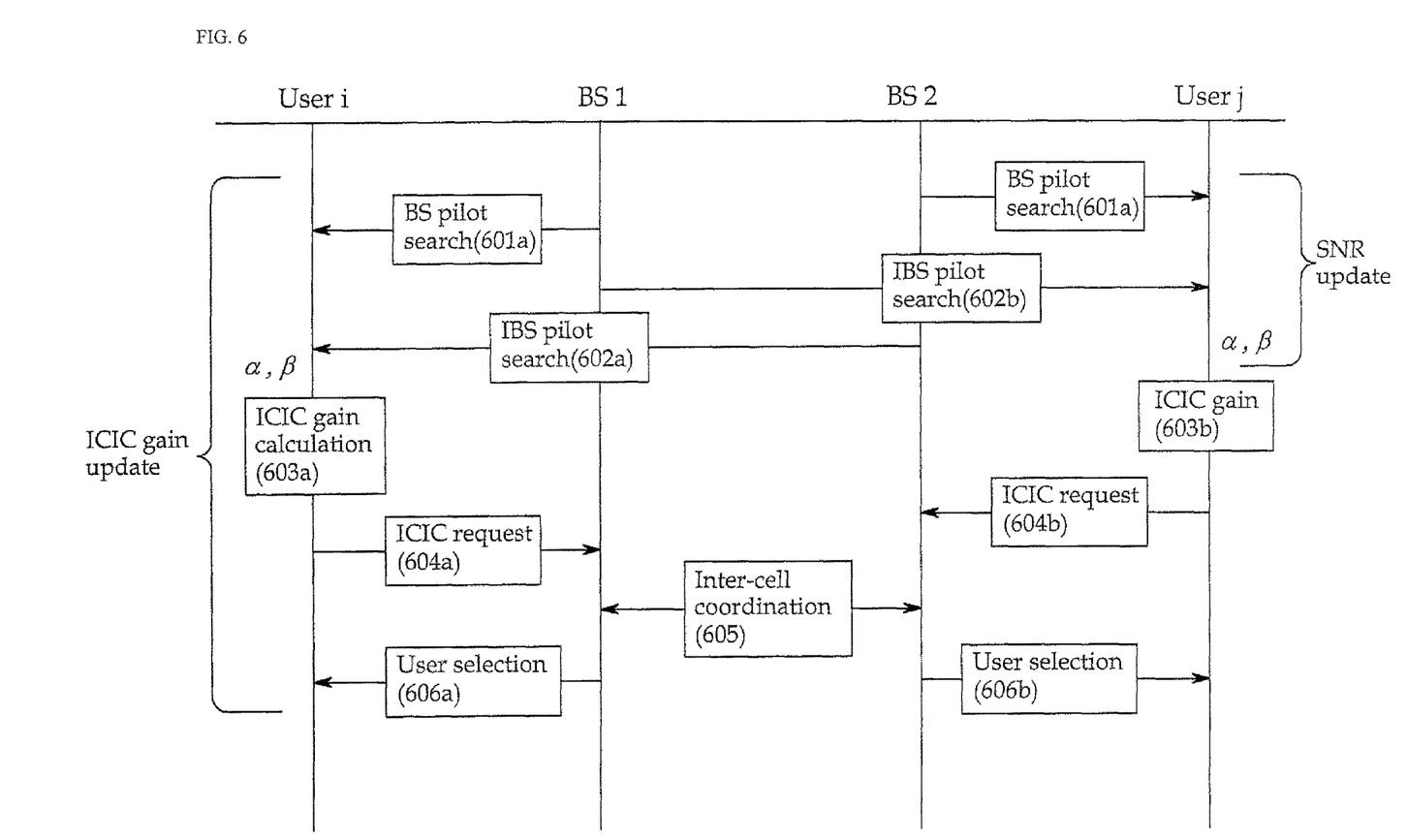
FIG. 6 illustrates exemplary signaling procedure for ICIC service.
Figure 7:
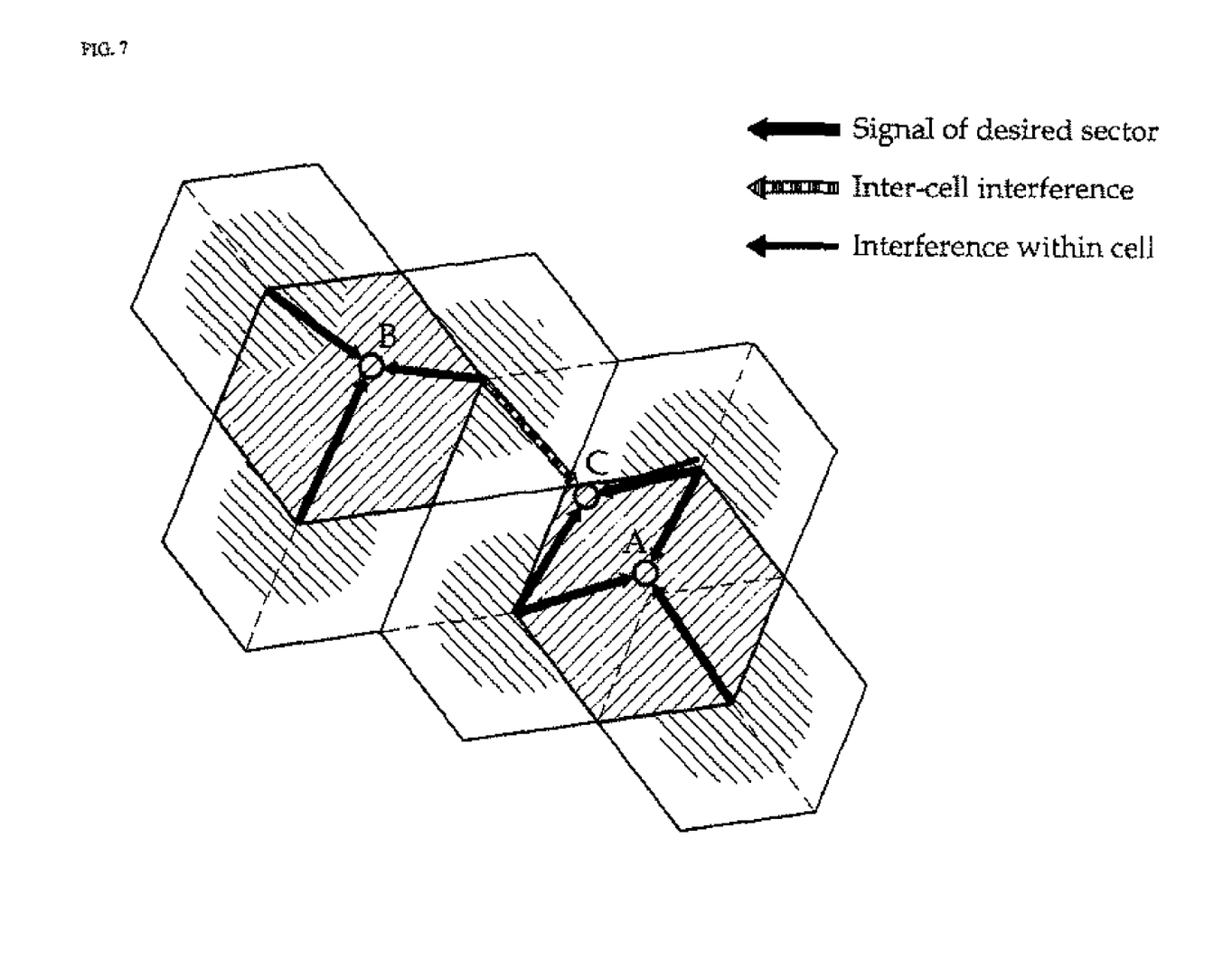
FIG. 7 exemplarily illustrates co-channel interference between clusters.

FIG. 6 illustrates exemplary signaling procedure for ICIC service.

Preferably, an inter-cell coordination step 605 may include a process of periodically checking the backhaul latency and making/approving the inter-cell request.

In accordance with the present invention, the method for a multi-cell interference control service is used for a change in interference of a terminal and a change in condition of a network when the terminal is located at a cell boundary area, to increase the capacity of the entire system.

In accordance with the present invention, the method for a multi-cell interference control service is available for a method of starting a dynamic multi-cell MIMO service, considering the interference by adjacent cells and the backhaul latency with the adjacent cells.

In accordance with the present invention, the method for a multi-cell interference control service is used for a change in interference of a terminal and a change in condition of a network, to satisfy a user QoS even if the terminal is located at a cell boundary area.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. An apparatus for a multi-cell interference control service, the apparatus comprising:
    a user terminal for requesting interference control from a BS (base station); and
    a serving BS for requesting the interference control from an adjacent BS,
    wherein the user terminal comprises:
        an SINR (signal to interference plus noise ratio) measurement unit for sensing interference level of an adjacent cell;
        a collaboration determination unit for determining whether to collaborate with the adjacent BS, considering a user QoS (quality of service);
        a collaboration gain determination unit for requesting multi-cell interference control, considering interference control gain; and
        a collaboration request signal transmission unit for requesting collaboration with the adjacent BS from the serving BS, and wherein the serving BS comprises:
    a collaboration gain information collection unit for collecting collaboration gain information of the user terminal;
    an inter-cell signal control unit for requesting inter-cell interference control; and
    a service start determination unit for determining whether to start an interference control service with a collaborating adjacent cell.

2. The apparatus according to claim 1, wherein, when the user QoS is not satisfied, the number of cells is three and multi-cell handover probability $$\left( \frac{\alpha^2 + \beta^2}{1 + \alpha^2 + \beta^2} \right)$$

is greater than a threshold value ($\gamma$) being set for collaboration interference control with the adjacent cell, the collaboration request signal transmission unit transmits a collaboration interference control request signal.

3. The apparatus according to claim 1, wherein the BS receiving the collaboration interference control request with the adjacent cell from the user terminal approves the interference control request of the user terminal, considering backhaul capacity with the adjacent cell and whether there is an idle resource of the adjacent cell.

4. The apparatus according to claim 1, wherein, when the user QoS is not satisfied, the number of cells is two and multi-cell handover probability $$\left( \frac{\alpha^2 + \beta^2}{1 + \alpha^2 + \beta^2} \right)$$

is greater than a threshold value ($\gamma$) being set for collaboration interference control with the adjacent cell, the collaboration request signal transmission unit transmits a collaboration interference control request signal.

5. The apparatus according to claim 4 or 2, wherein the transmitted collaboration interference control request signal further comprises: an ID of the collaborating interference cell, and handover probability being calculated to determine the priority among a number of users.

6. The apparatus according to claim 4 or 2, wherein the collaboration request signal transmission unit further comprises:
    a unit for variably setting the threshold value ($\gamma$), depending on the number of collaborating cells, inter-cell costs, and a user terminal profile.

7. A method for a multi-cell interference control service, the method comprising:
    requesting interference control from each user terminal to a serving BS (base station); and
    requesting interference control from the serving BS to an adjacent BS;
    wherein requesting interference control from each user terminal to a serving BS (base station) further includes:
        sensing interference level of an adjacent cell in an SINR (signal to interference plus noise ratio) measurement unit;
        determining whether to collaborate with the adjacent BS by considering a user QoS (quality of service) in a collaboration determination unit;
        determining interference control gain to request multi-cell interference control in a collaboration gain determination unit; and
        transmitting a signal for requesting collaboration with the adjacent BS to the serving BS in a collaboration request signal transmission unit, and
    wherein requesting interference control from the serving BS to an adjacent BS further includes:
        collecting collaboration gain information of the user terminal in a collaboration gain information collection unit;
        requesting inter-cell interference control from the adjacent BS after checking the collaboration gain information in an inter-cell signal control unit; and
        determining whether to start an interference control service with the collaborating adjacent cell in a service start determination unit.

8. The method according to claim 7, wherein requesting inter-cell interference control from the adjacent BS further includes:
    acquiring a channel resource for collaborating communication with the adjacent BS.

9. The method according to claim 7, wherein requesting inter-cell interference control from the adjacent BS further includes:
    predetermining a channel resource for collaborating communication with the adjacent BS.

* * * * *